United States Patent
Hanazawa et al.

(10) Patent No.: US 8,126,714 B2
(45) Date of Patent: Feb. 28, 2012

(54) VOICE SEARCH DEVICE

(75) Inventors: Toshiyuki Hanazawa, Tokyo (JP);
Youhei Okato, Tokyo (JP)

(73) Assignee: Mitsubishi Electric Corporation,
Tokyo (JP)

(*) Notice: Subject to any disclaimer, the term of this patent is extended or adjusted under 35 U.S.C. 154(b) by 992 days.

(21) Appl. No.: 12/060,583

(22) Filed: Apr. 1, 2008

(65) Prior Publication Data

US 2008/0255841 A1    Oct. 16, 2008

(30) Foreign Application Priority Data

Apr. 10, 2007  (JP) ................. 2007-102852

(51) Int. Cl.
*G10L 15/18* (2006.01)
*G10L 15/00* (2006.01)
(52) U.S. Cl. ........................ 704/257; 704/231
(58) Field of Classification Search ........... 704/231–257
See application file for complete search history.

(56) References Cited

U.S. PATENT DOCUMENTS 5,832,428 A * 11/1998 Chow et al. ............ 704/254

(Continued)

FOREIGN PATENT DOCUMENTS

| JP | 61-182100 | 8/1986 |
| JP | 63-300298 | 12/1988 |
| JP | 2000-315095 | 11/2000 |

(Continued)

OTHER PUBLICATIONS

Fujii et al., Speech-Driven Text Retrieval: Using Target IR Collections for Statistical Language Model Adaptation in Speech Recognition, Information Retrieval Techniques for Speech Applications, Lecture Notes in Computer Science, Jan. 2002.*

*Primary Examiner* — Samuel G Neway
(74) *Attorney, Agent, or Firm* — Oblon, Spivak, McClelland, Maier & Neustadt, L.L.P.

(57) ABSTRACT

A text data search using a voice is conventionally a full-text search using a word as an index word for a part recognized as a word in an input voice. Therefore, if any of the parts recognized as the words is falsely recognized, a search precision is lowered. In the present invention, referring to a language model generated by a language model generating part from text data to be subjected to a search which is divided by a learning data dividing part into a linguistic part and an acoustic model obtained by modeling voice features, a voice recognition part performs voice recognition for the input voice to output a phonemic representation. A matching unit converting part divides the phonemic representation into the same units as those of a text search dictionary, which is obtained by dividing the text data to be subjected to the search into the units smaller than those of the language model. A text search part uses the result of division to make a search on the text search dictionary.

5 Claims, 10 Drawing Sheets

U.S. PATENT DOCUMENTS

| | | | |
|---|---|---|---|
| 6,418,431 B1 * | 7/2002 | Mahajan et al. | 1/1 |
| 6,952,675 B1 * | 10/2005 | Tahara et al. | 704/255 |
| 2002/0120451 A1 * | 8/2002 | Kato et al. | 704/258 |
| 2005/0187769 A1 * | 8/2005 | Hwang et al. | 704/240 |
| 2005/0256715 A1 * | 11/2005 | Okimoto et al. | 704/257 |
| 2008/0052073 A1 * | 2/2008 | Goto et al. | 704/251 |

FOREIGN PATENT DOCUMENTS

| | | |
|---|---|---|
| JP | 2002-41081 | 2/2002 |
| JP | 2003-271629 | 9/2003 |
| JP | 2005-285138 | 10/2005 |
| JP | 2007-156286 | 6/2007 |

* cited by examiner

| ID number | KANA-KANJI REPRESENTATION | PHONEMIC REPRESENTATION |
|---|---|---|
| 1 | WAKAYAMANONACHIOTAKI | wakayamanonaciootaki |
| 2 | NIKKONOKEGONNOTAKI | niQkoonokegoNnotaki |
| 3 | TOKYONOCHIYODAKUYAKUSYO | tookjoonociyodakukakusjo |
| . . . | . . . | . . . |

FIG. 2

| INDEX WORD | ID NUMBER |
|---|---|
| wa | 1 |
| ka | 1 |
| ya | 1 |
| ma | 1 |
| no | 1, 2 |
| na | 1, |
| ci | 1, |
| o | 1, 2 |
| ta | 1, 2 |
| ki | 1, 2 |
| ni | 2 |
| Q | 2 |
| ko | 2 |
| ke | 2 |
| go | 2 |
| N | 2 |

FIG. 3

| SYLLABLE RATE Rs | WEIGHTING FACTOR w |
|---|---|
| 0 ~ 0.1 | 1 |
| 0.1 ~ 0.3 | 2 |
| 0.3 ~ 0.5 | 3 |
| 0.5 ~ 0.7 | 4 |
| 0.7 ~ 1.0 | 5 |

FIG. 4

| NUMBER OF SYLLABLES | NUMBER OF CANDIDATES TO BE OUTPUT |
|---|---|
| 1～2 | 3 |
| 3～4 | 2 |
| 5以上 | 1 |

FIG. 9

VOICE SEARCH DEVICE

BACKGROUND OF THE INVENTION

1. Field of the Invention

The present invention relates to a device which uses voice recognition to search for various texts such as a document.

2. Description of the Related Art

As a technique of searching for various texts such as a document by using a voice, a method of using dictation voice recognition to convert a voice into a text to make a full-text search on a text is common. According to this method, however, the number of recognizable words is limited to several thousands to several tens of thousands. Therefore, if a document containing words, which are out of the range of recognizable words, is to be found by a search, it is necessary to take the presence of unknown words into consideration.

In order to cope with the above-described problem, Japanese Patent Application Laid-open No. 2003-271629 discloses the following technique. In a document to be found by a search, only the top K words, which are the most frequently appearing words, are recognized as words, whereas the other words are recognized in units of syllables. Then, a full-text search is made by using the words extracted as the results of recognition to preliminarily select a document. Thereafter, the part recognized as a syllable string is estimated as a word to obtain a final result of the search.

In the above-described related art, the full-text search is performed using the words as index words for the parts recognized as words contained in an input voice. Therefore, if any of the parts recognized as the words is falsely recognized, a search precision is disadvantageously lowered. For example, even if a speech is "wakayamanonachiotaki" and the result of recognition is fully obtained as words as "okayama no machi otaku", a document containing "wakayamanonachiotaki" cannot be found by the search.

SUMMARY OF THE INVENTION

The present invention is devised to solve the above-described problem, and has an object of enabling a search as long as a speech is acoustically similar to the result of voice recognition even if a character representation of the speech and that of the result of voice recognition are not identical with each other.

The present invention has another object of providing a technique of preventing a recognition rate from being lowered even for a document containing an unknown word.

The present invention has a further object of providing a technique of reducing an incomplete search even when the speech is short and provides only few keys for the search.

A voice search device according to the present invention includes:

learning data dividing means for dividing text data to be subjected to a search such as a document into predetermined linguistic units and outputting a result of division;

language model generating means for generating a language model for voice recognition based on the result of division;

text dictionary generating means for dividing the text data to be subjected to the search such as the document into units, each being smaller than that in the learning data dividing means, to generate a text search dictionary;

voice recognition means for using the language model to recognize an input voice and to output a result of voice recognition as a text;

matching unit converting means for dividing the result of voice recognition into the same division units as those in the text dictionary generating means and outputting a result of division; and text search means for receiving an output from the matching unit converting means as an input to make a text search by using the text search dictionary.

According to the present invention, referring to the language model obtained by dividing the text data into linguistic units and an acoustic model obtained by modeling voice features, voice recognition is performed for an input voice to output a phonemic representation. The matching unit converting means divides the phonemic representation into the same units as those of the text search dictionary, each of the units being smaller than that of the language model. Text search means uses the result of division to make a search on the text search dictionary. As a result, the present invention has an effect of enabling a desired facility to be found by the search even if a part of a word string corresponding to the result of recognition is falsely recognized.

BRIEF DESCRIPTION OF THE DRAWINGS

In the accompanying drawings:

FIG. 2 is an explanatory view of an exemplary content of a language model data memory;

FIG. 3 is an explanatory view of an exemplary content of a text search dictionary;

FIG. 4 is an explanatory view of an exemplary content of a weighting factor table in a second embodiment;

FIG. 9 is an explanatory view of an exemplary content of a voice recognition candidate number table in the fourth embodiment.

DETAILED DESCRIPTION OF THE PREFERRED EMBODIMENTS

First Embodiment

Figure 1:
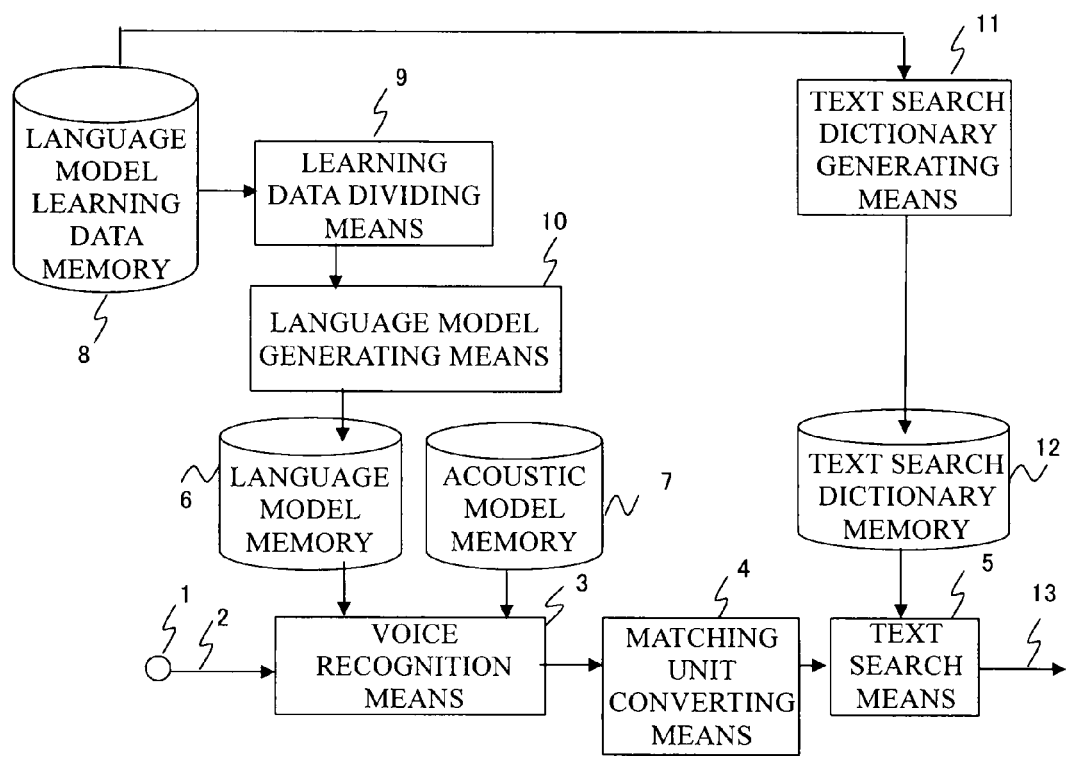
FIG. 1 is a block diagram illustrating a configuration of a first embodiment of a voice search device according to the present invention.

FIG. 1 is a block diagram illustrating a configuration of a first embodiment of a voice search device according to the present invention.

In FIG. 1, the voice search device includes a voice input terminal 1, an input voice 2, voice recognition means 3, matching unit converting means 4 for converting a matching unit used for the result of voice recognition into another unit, text search means 5, a language model memory 6, an audio model memory 7, a language model learning data memory 8, learning data dividing means 9, language model generating means 10, text search dictionary generating means 11, a text search dictionary memory 12, and a search result 13. The audio model memory 7 stores an audio model obtained by modeling voice features. In this embodiment, the audio model is, for example, an HMM (Hidden Markov Model).

In this first embodiment, the following case will be described as an example. A name of each of facilities and tourist spots around Japan (hereinafter, the facilities and the tourist spots are collectively referred to as facilities for simplicity) is regarded as a text document composed of a plurality of words. The name of the facility is found by a search using voice recognition. The facility name search, which is made not within the framework of general word voice recognition but within the framework of a text search, is advantageous in that even partial matching enables a facility name to be found by the search even if a user does not know the exact facility name to be found by the search.

An operation of the voice search device according to this first embodiment will now be described. Prior to voice recognition and a search, a language model and a text search dictionary are generated in advance to be stored in the language model memory 6 and the text search dictionary memory 12, respectively.

First, a method of generating the language model will be described. An ID number, a Kana/Chinese character representation, and a phonemic representation of each of the facilities to be subjected to the search are prestored in the language model learning data memory 8. An exemplary content of the language model learning data memory 8 is shown in FIG. 2.

The learning data dividing means 9 receives inputs of the character presentation and the phonemic representation of each facility, which are stored in the language model learning data memory 8, to perform a morphological analysis to divide a character string into, for example, words.

For example, when the character representation is "wakayamanonachiotaki" and the phonemic representation is "wakayamanonaciootaki", the character string is divided as "(wakayama)/(no)/(naci)/(ootaki)". The parentheses "( )" indicate that the character string in the parentheses is the phonemic representation. The sign "/" indicates the position of division and is not included in the learning data of the language model.

The learning data dividing means 9 performs the above-described processing for all the facility names stored in the language model learning data memory 8, and then, outputs the results of division to the language model generating means 10.

The language model generating means 10 receives the inputs of the results of division for all the facilities to generate the language model, and stores the generated language model in the language model memory 6. The language model is, for example, a trigram model in this first embodiment.

Next, a method of generating the text search dictionary will be described. The text search dictionary generating means 11 receives the inputs of the phonemic representation and the ID number of each of the facilities, which are stored in the language model learning data memory 8, to divide the phonemic representation. A unit of division in the text search dictionary generating means 11 is smaller than the word corresponding to the unit of division in the learning data dividing means 9. The unit of division is, for example, a syllable in this first embodiment. For the facility with the ID number 1 stored in the language model learning data memory 8, the phonemic representation is "wakayamanonaciootaki", and the result of division is obtained as "wa/ka/ya/ma/no/na/ci/o/o/ta/ki".

The text search dictionary generating means 11 performs the above-described processing for all the facility names stored in the language model learning data memory 8. Then, each of the syllables is used as an index word to generate, for example, an inverted file. The generated inverted file is stored as the text search dictionary in the text search dictionary memory 12. FIG. 3 illustrates an example of the text search dictionary generated from the facilities having the ID numbers 1 and 2.

Next, voice recognition and search operations will be described.

Upon reception of the input of the voice 2 from the voice input terminal 1, the voice recognition means 3 uses the language model stored in the language model memory 6 and the acoustic model stored in the acoustic model memory 7 to perform voice recognition. As a result of the voice recognition, the voice recognition means outputs the phonemic representation of the word string.

For example, when a speech as the input voice is "wakayamanonachiotaki" and the result of recognition is "okayama/no/machi/otaku", the voice recognition means 3 outputs "okayama/no/maci/ootaku" corresponding to the phonemic representation of the result of recognition.

Upon reception of an input of the phonemic representation, the matching unit converting means 4 divides the phonemic representation into units smaller than the word, and outputs the result of division. The unit of division is the same as that used in the text search dictionary generating means 11. Specifically, as described above, since the unit of division in the text search dictionary generating means 11 is the syllable in this embodiment, the unit of division in the matching unit converting means 4 is also the syllable. Therefore, in this first embodiment, the matching unit converting means 4 outputs "o/ka/ya/ma/no/ma/ci/o/o/ta/ku".

Next, the text search means 5 receives the result of division as an input and refers to the inverted file stored in the text search dictionary memory 12 sequentially from the first syllable of the result of division. Then, the text search means 5 adds one to a score of the facility containing the syllable of interest in the result of division. The text search means 5 performs the above-described processing from the first syllable to the last syllable of the result of division. Then, the text search means 5 outputs the facility having a score equal to or higher than a predetermined threshold value S as a result of the search. The threshold value S is, for example, 0.8 times as large as the number of syllables contained in the result of recognition. Specifically, in this first embodiment, a value obtained by multiplying eleven corresponding to the number of input syllables by 0.8, that is, 11*0.8=8.8 is used as the threshold value S.

As a result, the input syllable string "o/ka/ya/ma/no/ma/ci/o/o/ta/ku" matches with the syllable string "wa/ka/ya/ma/no/na/ci/o/o/ta/ki" corresponding to a correct speech "wakayamanonachiotaki" except for the last syllable "ku". Therefore, the facility name "wakayamanonachiotaki" having ten as a score can be output as the result of the search.

As described above, according to the present invention, the matching unit converting means 4 divides the phonemic representation into units, each being smaller than that used for the voice recognition, and the text search means 5 uses the result of division to make the text search. Therefore, the present invention has an effect of enabling a desired facility to be found by the search even if a part of the word string obtained as the result of recognition is falsely recognized.

Second Embodiment

In this second embodiment, the operations of the learning data dividing means 9 and the language model generating means 10 are modified as follows.

The learning data dividing means 9 receives the character representation and the phonemic representation of each of the facilities stored in the language model leaning data memory 8 as inputs to perform a morphological analysis to divide the character string into words. In this case, only the top K words which are the most frequently appearing words are left as words, whereas each of the other words is further divided into a string of syllables.

Although the words to be left undivided are selected based on a frequency of appearance in this second embodiment, another arbitrary reference may be used to select the words to be left undivided.

An output to the language model generating means 10 is provided with a flag indicating whether the unit of division for the phonemic representation is the word or the syllable. The appearance frequency K is a predetermined constant, for example, K=500.

For example, when three words, that is, "wakayama", "no", and "taki" in the character representation "wakayamanonachiotaki" of the facility stored in the language model learning data memory 8 illustrated in FIG. 2 are included in the words having the top K frequencies of appearance, the result of division is obtained as "wakayama[w]/no[w]/na[s]/ci[s]/o[s]/o[s]/taki[w]", which is then output. In this case, [ ] is a flag indicating whether the result of division is obtained as the word or the syllable, [w] indicates that the result of division is obtained as the word, and [s] indicates that the result of division is obtained as the syllable. On the other hand, when the words contained in a character representation "tokyonochiyodakuyakusyo" are all included in the words having the top K frequencies of appearance, the result of division is obtained as "tookjoo[w]/no[w]/ciyoda[w]/kuyakusjo[w]".

The learning data dividing means 9 performs the above-described processing for all the facility names stored in the language model leaning data memory 8, and then, outputs the results of division to the language model generating means 10.

The language model generating means 10 receives the input of the results of division to generate the language model. In this case, however, the language model generating means 10 learns the learning data of each of the facilities while weighting the learning data in the following manner.

Figure 5:
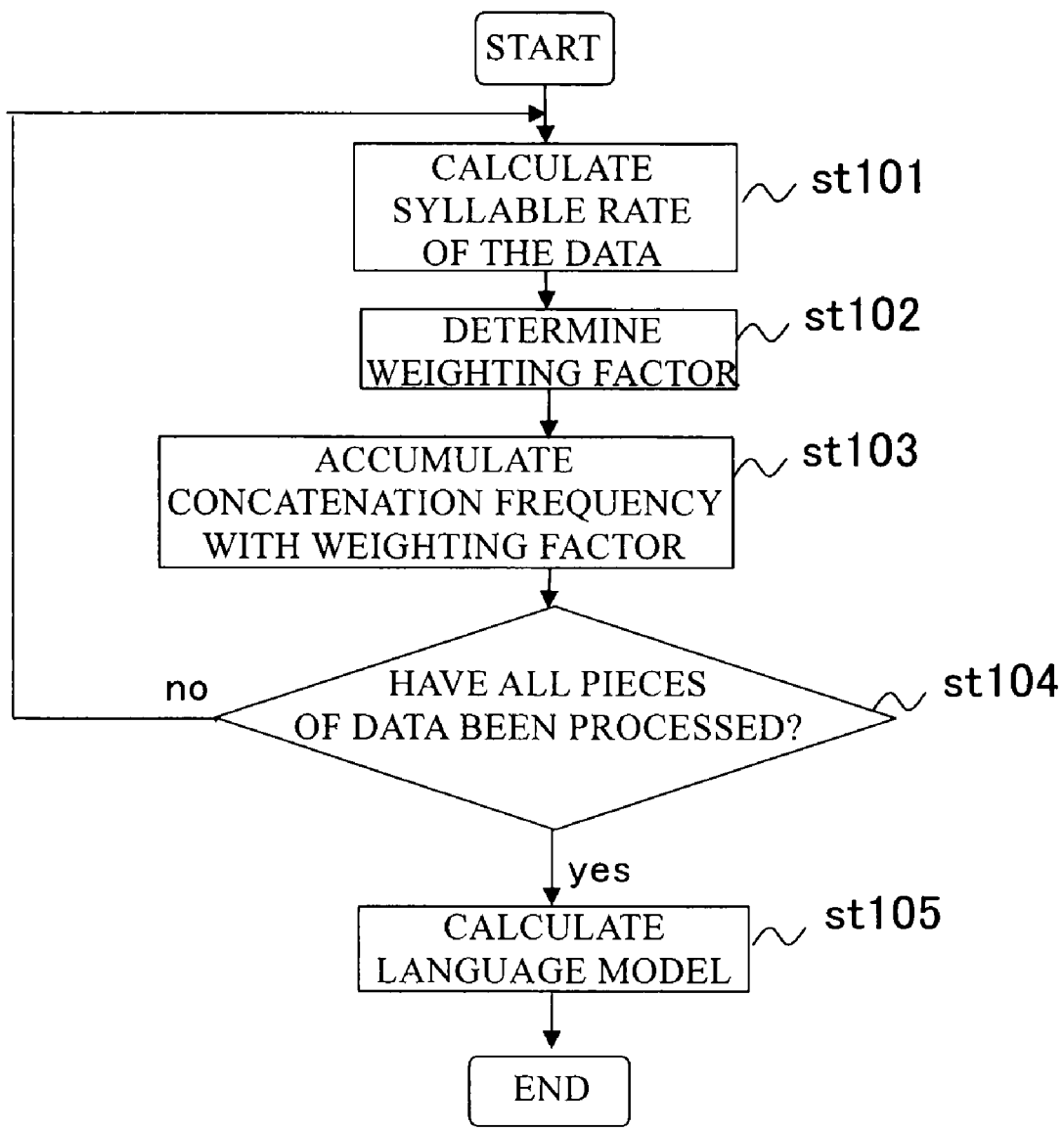
FIG. 5 is a flowchart of generation of a language model according to the second embodiment.

A procedure of generating the language model by the language model generating means 10 is illustrated in FIG. 5. Upon reception of the input of the result of division by the learning data dividing means 9, the language model generating means 10 calculates a rate of syllables (hereinafter, referred to as a syllable rate) Rs in the result of division according to the following Formula (1) (ST101).

$$Rs = Ns/N \quad (1)$$

where Ns is the number of syllables in the result of division, and N is a total number of words and syllables obtained by the division. For example, in "wakayama[w]/no[w]/na[s]/ci[s]/o[s]/o[s]/taki[w]", Ns is 4 and N is 7. Therefore, Rs=4/7≈0.57 is obtained. In the case of "tookjoo[w]/no[w]/ciyoda[w]/kuyakusjo[w]", Ns is 0 and N is 4. Therefore, Rs=0/4=0 is obtained.

Next, referring to a weighting factor table describing the relations between the syllable rates Rs and weighting factors stored in the language model generating means 10, a weighting factor w is determined for each facility (ST102). An example of the weighting factor table is illustrated in FIG. 4.

Since Rs=4/7≈0.57 is obtained for "wakayama[w]/no[w]/na[s]/ci[s]/o[s]/o[s]/taki[w]", the weighting factor w is determined as 4. Then, the language model generating means 10 regards the facility as having appeared four times. Specifically, the language model generating means 10 quadruples a concatenation frequency between words and syllables obtained from the facility (ST103).

On the other hand, since Rs=0 is obtained for "tookjoo[w]/no[w]/ciyoda[w]/kuyakusjo[w]", the weighting factor is obtained as 1. Therefore, a concatenation frequency between word and syllables obtained from this facility remains as one.

The language model generating means 10 performs the above-described processing for all the facilities stored in the language model learning data memory 8 to accumulate the concatenation frequency between words and syllables to generate the language model (ST105). The language model is, for example, the trigram model. Since the remaining operation is the same as that in the first embodiment, the description thereof is herein omitted.

In the related art, the facility having the result of division largely represented in syllables has a low linguistic likelihood calculated by the language model, and therefore tends to have a lowered recognition rate. By generating the language model in the above-described manner according to this embodiment, however, the frequency of appearance is set large for the facility having the result of division largely represented when the language model is generated. As a result, the linguistic likelihood can be increased to prevent the recognition rate from being lowered.

Third Embodiment

Figure 6:
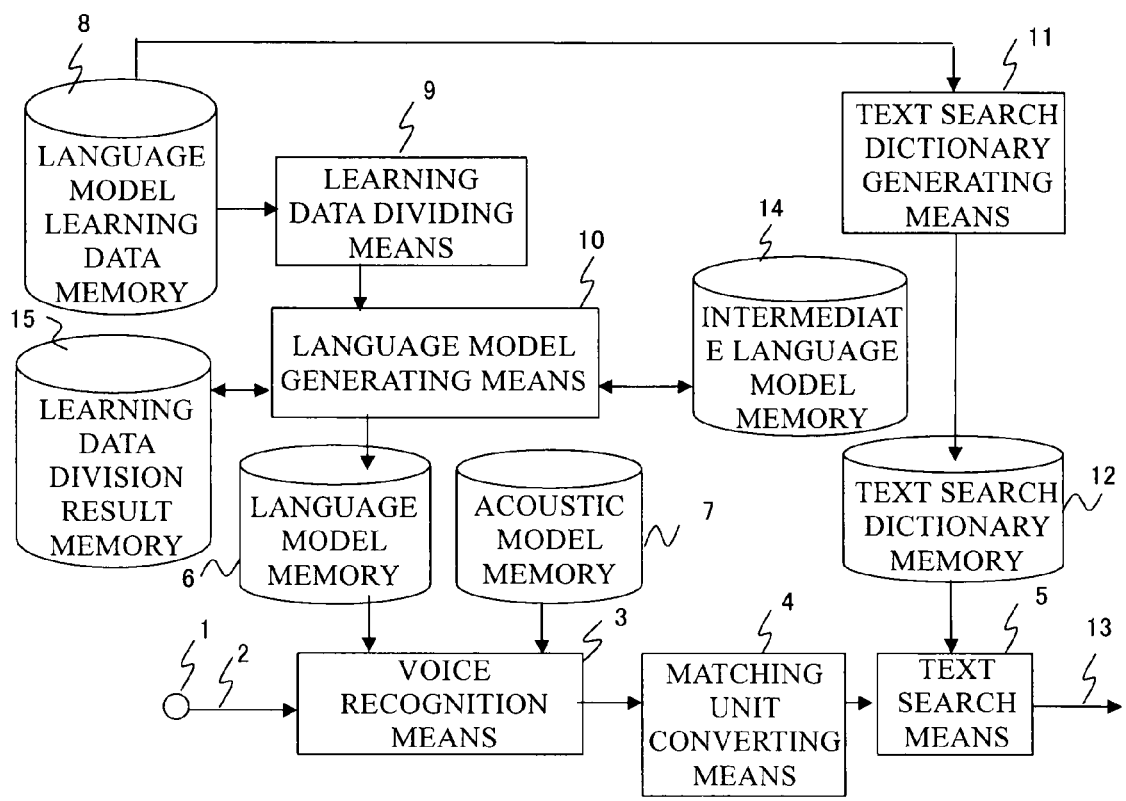
FIG. 6 is a block diagram illustrating a configuration of a third embodiment.

This third embodiment is obtained by adding an intermediate language model memory 14 and a language data division result memory 15 to the second embodiment described above. FIG. 6 illustrates an exemplary configuration of the third embodiment. Furthermore, the operation of the language model generating means 10 is modified as follows.

Figure 7:
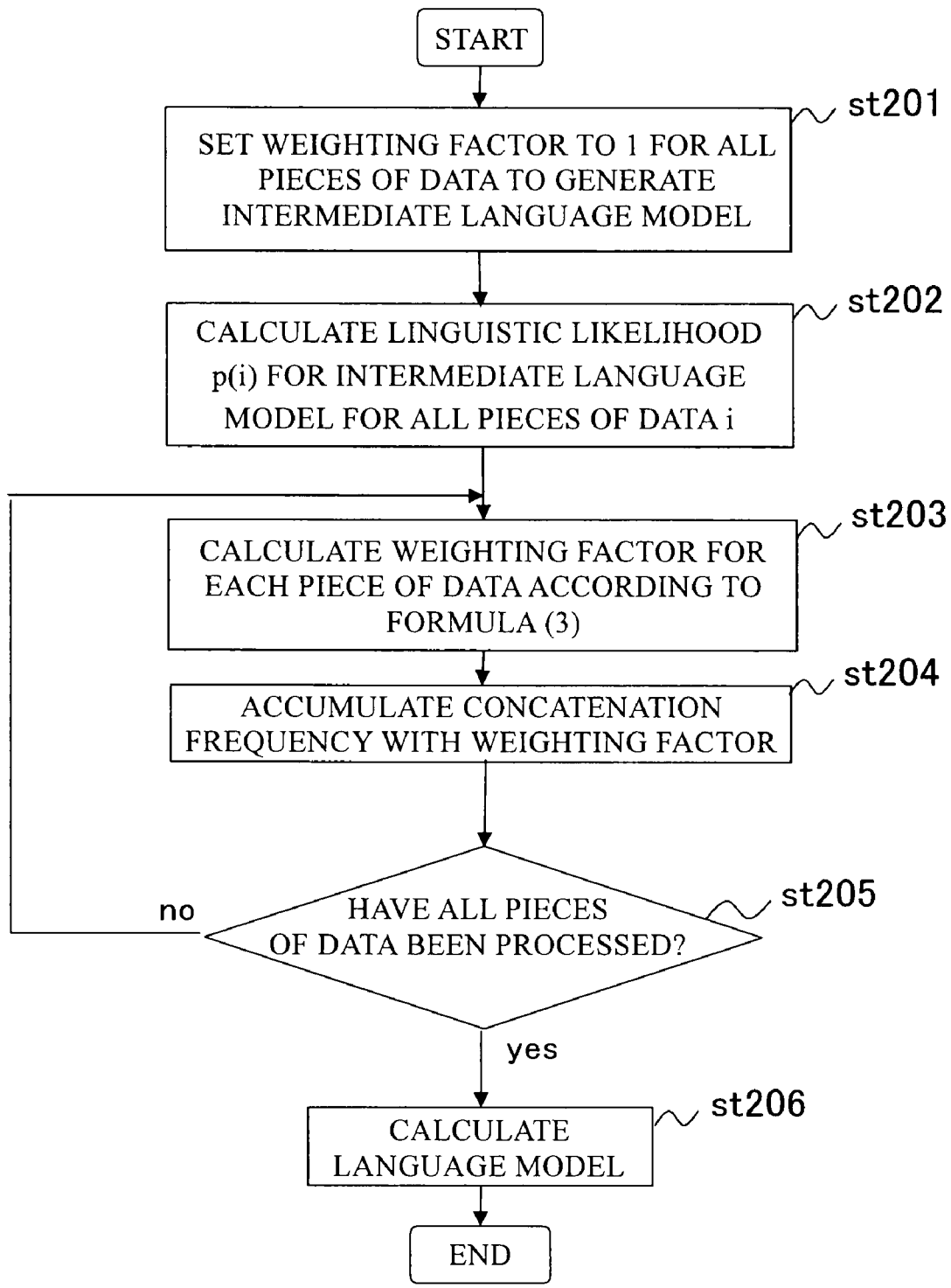
FIG. 7 is a flowchart of generation of the language model according to the third embodiment.

A procedure of the operation of the language model generating means 10 is illustrated in FIG. 7. The language model generating means 10 receives the same input as that in the second embodiment from the learning data dividing means 9. Then, the language model generating means 10 first sets all the added weights for the concatenation frequencies between words and syllables in the data of the respective facilities to 1 to generate the language model. The language model generating means 10 stores the generated language model as an intermediate language model in the intermediate language model memory 14. The intermediate language model is the trigram in this third embodiment. The results of division of the input data for all the facilities are stored in the learning data division result memory 15 (ST201).

Next, the result of division for each of the facilities, which is stored in the learning data division result memory 15, is picked up for each facility i. Then, the language model generating means 10 uses the intermediate language model stored in the intermediate language model memory 14 to calculate a linguistic likelihood P(i) according to the following Formula (2) (ST202).

$$P(i) = \Pi_{j=1,J} p(w_j | w_{j-2}, w_{j-1}) \quad (2)$$

where $p(w_j | w_{j-2}, w_{j-1})$ is a trigram probability for a divisional unit string $w_{j-2}$, $w_{j-1}$, and $w_j$, and J is the number of times of division for the facility i. Then, a weighting factor w(i) for the facility i is obtained by the following Formula (3) (ST203).

$$w(i) = f((\Sigma_{i=1,N} P(i))/P(i)) \quad (3)$$

where N is a total number of facilities to be subjected to the search, and f(x) is a function for moderating a variation of x. For example, as f(x), $$f(x) = x^{1/4} \quad (4)$$

is used.

As is understood from Formula (3) above, the weighting factor w(i) has a larger value for the facility having the smaller linguistic likelihood P(i) in the intermediate language model.

The language model generating means 10 regards the facility as having appeared for the number of times equal to the obtained weighting factor w(i). Specifically, the concatenation frequency between words and syllables obtained from the facility is multiplied by w(i) to accumulate the concatenation frequency (ST204).

The language model generating means 10 performs the above-described processing for all the results of division of the respective facilities stored in the learning data division result memory 15 to determine whether or not there is an unprocessed result of division for any of the facilities (ST205). Then, the concatenation frequency between words or syllables is accumulated to generate the language model. The generated language model is stored in the language model memory 6 (ST206). The language model is, for example, the trigram model. Since the remaining operation is the same as that in the second embodiment, the description thereof is herein omitted.

In the related art, the facility having the result of division largely represented in syllables has a low linguistic likelihood calculated by the language model, and therefore, tends to have a lowered recognition rate. According to this third embodiment, however, the appearance frequency at the generation of the language model is set large for the facility having a low linguistic likelihood in the intermediate language model when the language mode is generated. As a result, the linguistic likelihood can be increased to prevent the recognition rate from being lowered.

Fourth Embodiment

Figure 8:
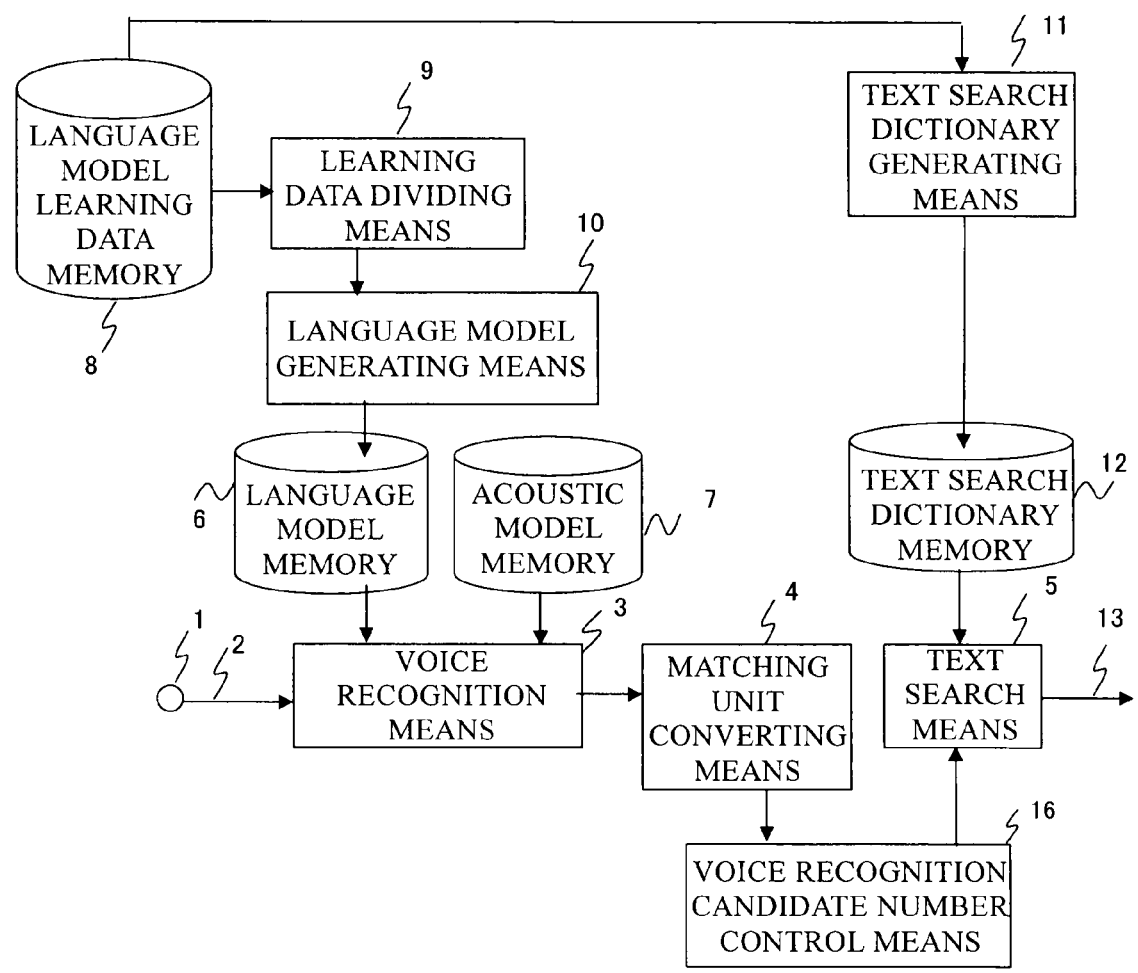
FIG. 8 is a block diagram illustrating a configuration of a fourth embodiment.

The fourth embodiment is obtained by adding voice recognition candidate number control means 16 to any one of the first to third embodiments and further modifying the operations of the voice recognition means 3, the matching unit converting means 4, and the text search means 5 as described below. An exemplary configuration of the fourth embodiment is illustrated in FIG. 8.

In this fourth embodiment, the case where the voice recognition candidate number control means 16 is added to the invention of the first embodiment will be described. Prior to the voice recognition, the language model and the text search dictionary are generated in advance by the same method as that in the first embodiment.

The voice recognition and search operations will be described. Upon reception of the input of the voice 2 from the voice input terminal 1, the voice recognition means 3 uses the language model stored in the language model memory 6 and the acoustic model stored in the acoustic model memory 7 to perform the voice recognition. Then, the voice recognition means 3 outputs the phonemic representation of the word string as a result of the voice recognition. As the result of the voice recognition in this fourth embodiment, however, the top L candidate phonemic representations in descending order of recognition scores are output. In this case, L is a constant equal to or larger than 2, and is 3 in this embodiment. For example, when a speech "oze" is made, and the first-ranked result of recognition is "tone", the second-ranked result is "oze", and the third-ranked result is "tobe", the phonemic representations corresponding to the first- to third-ranked results of recognition, "tone", "oze" and "tobe", are sequentially output.

The matching unit converting means 4 receives the phonemic representations corresponding to the L results of voice recognition to divide each of the phonemic representations obtained as the results of voice recognition into the units, each being smaller than the word, in the same manner as in the first embodiment. Then, the matching unit converting means 4 outputs the obtained result of division. As in the first embodiment, the unit of division is the syllable in this fourth embodiment.

The operation of the matching unit converting means 4 differs from that in the first embodiment in that the matching unit converting means 4 receives L inputs in descending order of recognition scores and outputs L results of division in the same order. In this embodiment, the matching unit converting means 4 outputs "to/ne", "o/ze", and "to/be" in this order.

The voice recognition candidate number control means 16 receives the L results of division as inputs and refers to the number of syllables of "to/ne" corresponding to the first-ranked candidate syllable division result and a voice recognition candidate number table stored in the voice recognition candidate number control means 16 to control the number of candidates to be output to the text search means.

The content of the voice recognition candidate number table is illustrated in FIG. 9. The number of candidates to be output is preset to be larger as the number of syllables in the first-ranked candidate syllable division result becomes smaller. Since the number of syllables in the first-ranked candidate syllable division result is 2 in this embodiment, the number of candidates to be output is determined as 3 with reference to the voice recognition candidate number table.

Next, the text search means 5 receives the three results of division as inputs. Then, referring to the inverted file serving as the text search dictionary stored in the text search dictionary memory 12, an operation of adding 1 to the score of the facility containing the syllable of interest is performed sequentially for the first syllable to the last syllable for each of the three results of division. Then, the text search means 5 outputs the facility having the score equal to or higher than the predetermined threshold value S as a result of search. The threshold value S is set to a value 0.8 times the number of syllables in the first-ranked recognition result. Specifically, since the number of input syllables is two in this embodiment, the threshold value S is obtained as: 2*0.8=1.6. By making the search in this manner, the second-ranked recognition result contains "o/ze" in this fourth embodiment. Therefore, "oze" corresponding to the right word has two as a search score, and can be output as a search result candidate.

Figure 10:
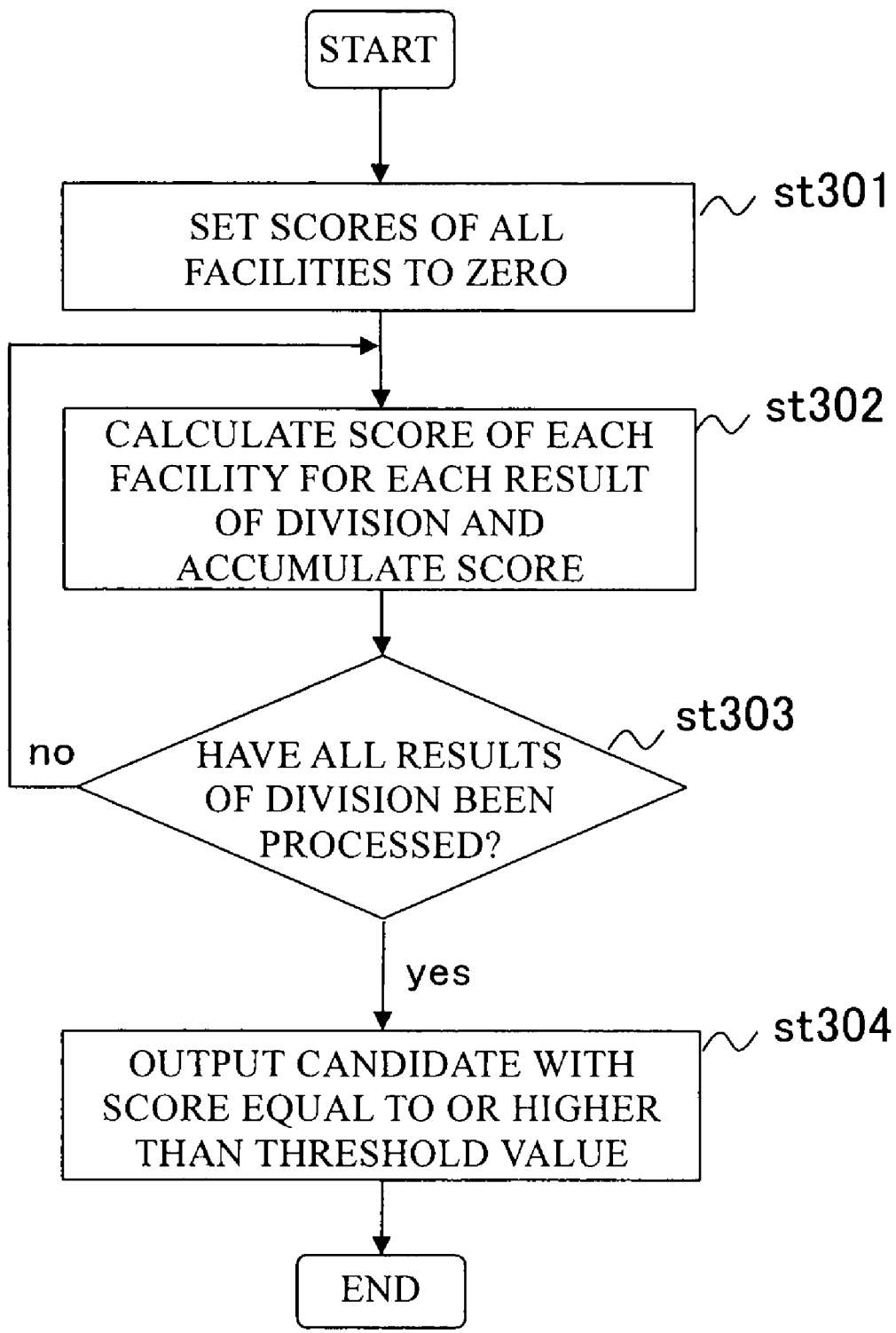
FIG. 10 a flowchart of a text search by text search means according to the fourth embodiment.

A specific processing content will be described referring to FIG. 10 corresponding to a flowchart of an operation procedure of the text search means 5. First, as initial processing, scores are set to 0 for all the facilities (ST301). Next, for the first one of the three results of division, the text search means 5 performs, referring to the inverted file, the operation of adding 1 to the score of the facility containing the syllable of interest, sequentially for the first syllable to the last syllable of the result of division (ST302).

Next, the text search means 5 determines whether or not there is any more result of division to be input (ST303). If there is any, the same processing is performed for the next result of division as an input. Then, the text search means accumulates a score of each of the facilities (ST302). On the other hand, if there is no more result of division to be input, the score accumulation processing is terminated. Then, the candidate having the score equal to or higher than the threshold value is output as a result of the search (ST304).

As described above, the voice recognition candidate number control means 16 controls the number of candidates, which are input to the text search means, to be larger as the number of syllables in the result of voice recognition becomes smaller. Therefore, when the result of recognition has a small number of syllables and therefore there is a low possibility that the candidate obtained by false recognition may contain correct syllables, even lower-ranked candidates obtained as the results of recognition are subjected to the search. In this manner, the present invention has an effect of reducing the possibility of failing to find a desired facility due to an incomplete search.

The present invention is available for a system which uses a voice to make a search on text data containing a large number of words, and specifically, is applicable to, for example, a car navigation system.

What is claimed is:

1. A voice search device comprising:
   learning data dividing means for dividing text data to be subjected to a search in a document into predetermined linguistic units and outputting a result of division;
   language model generating means for generating a language model for voice recognition based on the result of division;
   text dictionary generating means for dividing the text data to be subjected to the search in the document into units, each being smaller than that in the learning data dividing means, to generate a text search dictionary;
   voice recognition means for using the language model to recognize an input voice and to output a result of voice recognition as a text;
   matching unit converting means for dividing the result of voice recognition into the same division units as those in the text dictionary generating means and outputting a result of division; and
   text search means for receiving an output from the matching unit converting means as an input to make a text search by using the text search dictionary.

2. A voice search device according to claim 1, wherein the language model generating means generates the language model while weighting an accumulated frequency of a statistic of each of the documents to reduce a difference in linguistic likelihood between the documents, the linguistic likelihood being calculated based on the language model.

3. A voice search device according to claim 2, wherein:
   a larger unit and a smaller unit are used as the unit of division for the text data by the learning data dividing means; and
   the language model generating means sets a larger value for the weight of the accumulated frequency of the statistic of each of the documents as a rate of the smaller units in the result of division becomes larger.

4. A voice search device according to claim 2, wherein:
   the language model generating means uses the output from the learning data dividing means to generate an intermediate language model and uses the generated intermediate language model to calculate the linguistic likelihood for each of the documents to be subjected to the search; and
   the weight of the accumulated frequency of the statistic of each of the documents is set to a larger value for the document having lower linguistic likelihood.

5. A voice search device according to claim 1 or 2, wherein:
   the voice recognition means outputs top L (>1) results of voice recognition; and
   the voice search device further comprises voice recognition candidate number control means for controlling the number of candidates corresponding to the results of voice recognition to be output to the text search means according to the number of syllables in a first-ranked result of recognition.

* * * * *